Patented Jan. 28, 1930

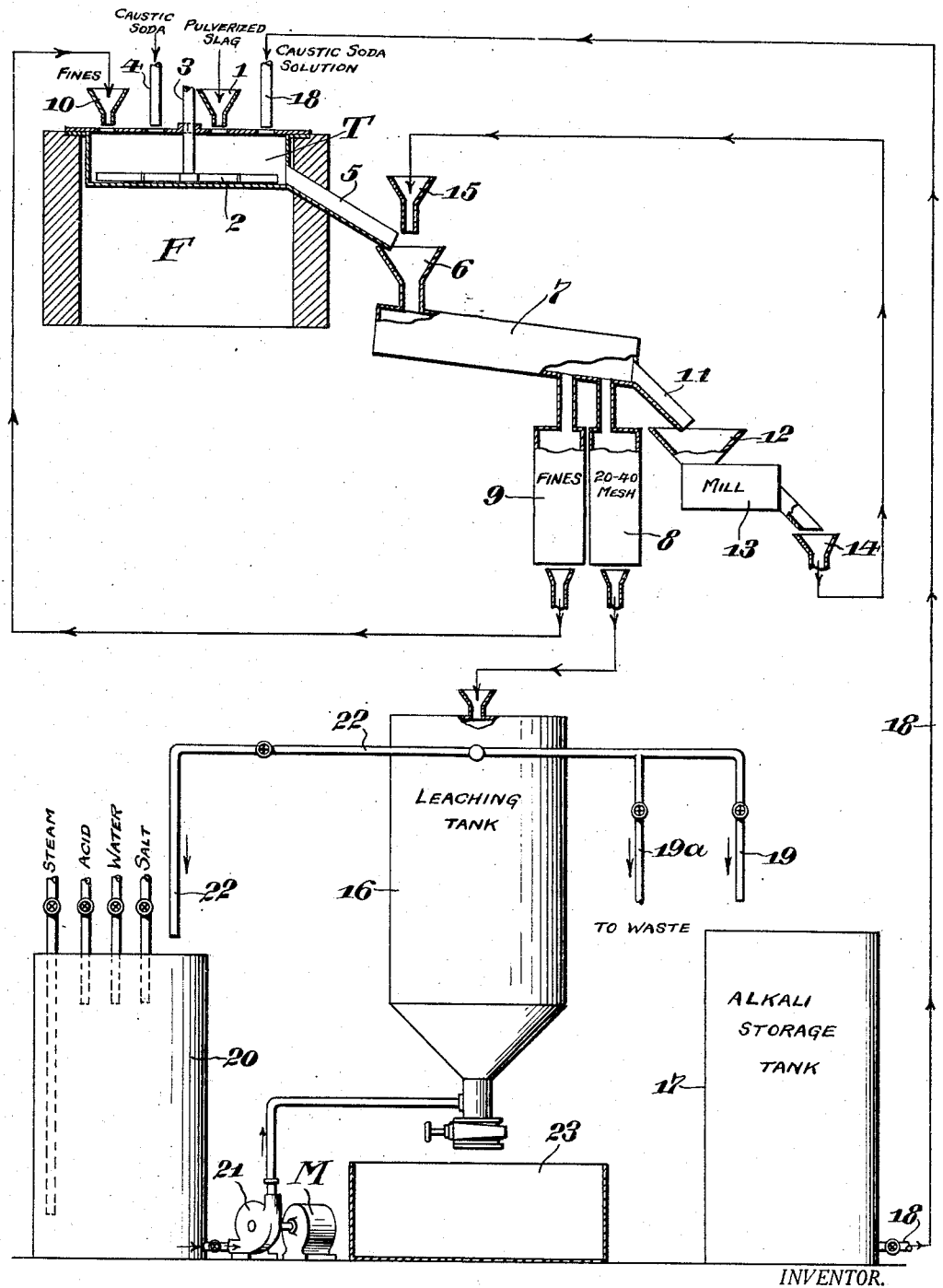

1,745,337

UNITED STATES PATENT OFFICE

SVEIN DAHL-RODE, OF PHILADELPHIA, PENNSYLVANIA, ASSIGNOR TO COCHRANE CORPORATION, OF PHILADELPHIA, PENNSYLVANIA, A CORPORATION OF PENNSYLVANIA

ZEOLITE AND METHOD OF MAKING SAME

Application filed December 23, 1924. Serial No. 757,602.

My invention relates to a method of manufacturing base-exchange substances or artificial zeolites, and to the products themselves, utilizable for various purposes, including the softening of water for use in laundries, hotels, as boiler feed water, and for kindred purposes.

My invention resides in the method and product hereinafter described and claimed.

For an understanding of my method and for an illustration of a mode of carrying it into execution, reference may be had to the accompanying drawing, which is largely a diagrammatic view of a system utilizable for the practice of my invention.

There is utilized as a starting material the slag from the furnaces or blast furnaces in which there are produced from their compounds or ores iron, manganese and the like. Any suitable slag may be utilized if containing in suitably large proportions silica, aluminum and calcium, magnesium or other metal, which upon treatment of the character hereinafter described will yield base-exchange compounds, such as double compounds of sodium and calcium aluminum silicate, or equivalent. The slag is preferably watercooled or granulated by passsing it while molten, preferably directly from the furnace, into water, thereby effecting desirable porosity and characteristics favorable to subdivision into fine grains or powder.

For an understanding of my invention, it will be described with regard to its application to the treatment of iron furnace slag.

The iron furnace slag, preferably watercooled as aforesaid, is ground or pulverized, in a ball mill or equivalent, to approximately 50 to 100 mesh, or finer. The pulverized slag is delivered, as from a hopper or funnel 1, into the treating and drying chamber or kettle T, which is preferably provided with agitating means, such as an agitator 2, of any suitable character or construction, actuated or rotated by the shaft 3 driven by any suitable source of power, not shown. There is introduced into the treating chamber T, as through the pipe or passage 4, caustic soda, or any suitable equivalent alkali, as potassium or other hydroxide, or sodium, potassium or other carbonate, or a mixture of any two or more of these alkalies. Water is introduced into the treating chamber T, the proportions, by weight, of pulverized slag, caustic soda and water preferably being of the order of 100 to 80 to 120. The mixture is continuously slowly agitated or stirred by the agitator 2, and its temperature raised, by heat applied in any suitable manner, as, for example, by combustion in the furnace F. For a period of the order of 30 minutes the mixture is kept at or near its boiling point, and thereafter the application of heat is continued to evaporate off substantially all of the water, other than that which is combined with the product. The product is dried, preferably within the chamber T, at a temperature ranging from about 300 to about 600 degrees F. Agitation is preferably continued during this drying operation to effect a hard product comprising pieces of the size of hazel nuts or marbles, and smaller, the size of the pieces depending to considerable extent upon the method and effectiveness of the agitation.

By the aforesaid treatment of the pulverized slag with caustic soda or equivalent, there is formed a base-exchange substance or artificial zeolite comprising, for example, double compounds of sodium and calcium aluminum silicate, which, however, is preferably further treated, as hereinafter described, to effect a refined product and for recovery of a portion of the caustic soda or other alkali utilized in the reaction.

The dried product is delivered from the treating chamber T, as through the chute 5, to the hopper 6, from which it passes into the sifter 7, in which the pieces or particles of different sizes are separated from each other. The ultimate material is preferably in granules passing through 20 mesh and retained upon 40 mesh screens. Granules of this size may be separated by the screening mechanism or sifter 7 and delivered into the receptacle 8, from which they are later withdrawn for further treatment. The fines, or particles which pass through a 40 mesh screen, are delivered into the receptacle 9, from which they are withdrawn and returned to the hopper or funnel 10, from which they may be delivered into the treating chamber T into mixture with a further or new batch of pulverized slag, alkali and water, the fines so in mixture being substantially neutral with respect thereto, but due to the subsequent drying process in the chamber T are in effect included or incorporated in larger masses of the dried product and passed therewith to the apparatus 7. By so returning the fines, they are saved and ultimately appear as or in granules of the desired size, for example, 20–40 mesh. The coarser material is delivered from the apparatus 7, as through the chute 11, to the hopper 12, which delivers into the crusher or mill 13 preferably of such character as to effect as large a percentage as possible of granules of the desired size, as, for example, 20–40 mesh. The crushed material is delivered from the mill 13, as to the hopper 14, and returned to the hopper 15, from which it is again passed through the screening apparatus 7, and any material coarsed than 20–40 mesh again finds its way to the mill 13, and after crushing is returned to the sifter 7.

The granules of desired size, as 20–40 mesh, are delivered from the container 8 into the leaching or treating tank 16, which is preferably provided with agitating means. Water, preferably hot, is circulated through the leaching tank from tank 20 through pump 21 and back through pipe 22, accompanied preferably by agitation in tank 16. The granules are first treated in the tank 16 with that amount of water required in the treating chamber T to make up a mixture with pulverized slag of the proportions above described. As much as possible of the alkali of caustic soda is leached from the particles in the tank 16 to effect an alkaline liquor as highly concentrated as possible. This liquor is withdrawn from the tank 16 and delivered through pipe 19 into the alkali storage tank 17, from which it is withdrawn as required and delivered into the tank T, in the aforesaid proportion, through the pipe 18, into mixture with pulverized slag, suitable additional amount of alkali introduced through passage 4, and fines returned from the receptacle 9.

After removal of the more concentrated alkali solution from the tank 16, the granules therein are further leached by additional or fresh water, preferably hot, which removes more alkali or caustic soda, which may be drawn off through the pipe 19ª to waste, or to suitable destination for further recovery of alkali if found economically desirable.

The base-exchange material or artificial zeolite at this stage may still contain some alkali, as caustic soda. It will also generally contain calcium, much of which may be in the form of calcium oxide or hydrate, which it is desirable shall be removed. The alkali and the undesirable calcium compounds are removed by treatment of the zeolite granules, preferably still within the tank 16, with a dilute or weak acid solution, as, for example, a solution of acetic or equivalent organic acid, or by dilute sulphuric, hydrochloric, nitric or other mineral acid.

Acetic acid solution, preferably hot, is advantageous for treatment at this stage, for it will neutralize the alkali or caustic soda and will convert the calcium compounds into highly soluble calcium acetate, which is easily washed from the zeolite; and furthermore, acetic acid is not likely seriously to attack or dissolve the zeolite itself.

While acetic acid has the advantages above described, its cost is comparatively high, and it may generally be preferable to utilize a dilute solution of sulphuric acid, prepared in the tank 20 by introduction of acid and water, and utilized preferably hot, heat being applied in any suitable way, as, for example, by introduction of steam. The hot dilute acid solution is circulated by the pump 21, driven by motor M, through the tank 16 from and back to tank 20, to effect circulation through and agitation with the zeolite granules to neutralize the alkali or caustic soda and, in addition, converting the calcium compounds into calcium sulphate, a portion of which goes into solution and the remainder of which appears as a precipitate in the pores of the granules and in suspension in the liquor.

The acid treatment is continued until the aforesaid reactions are more or less complete, as may be suitable or desirable. The reaction may be continued until a sample of the granules, washed with fresh water, and pulverized, does not show alkali or free alkali when tested by suitable indicator, as, for example, phenolphthalein. In some cases, however, as for example, when the zeolite is to be utilized for softening boiler feed water where slight alkalinity is not harmful, the aforesaid acid treatment may be discontinued before the alkali is completely neutralized.

While acid treatment is preferred, in some instances it will suffice to thoroughly wash the granules with water to remove alkali and calcium compounds, but in such case the operation is necessarily considerably prolonged and generally not so complete or effective.

After the acid treatment above described, the granules are washed within the tank 16 with cold water to remove the soluble products of reaction of the acid with alkali and calcium compounds and for removing, when sulphuric acid has been utilized, such of the calcium sulphate as exists in solid or precipitate form. The washing is continued until the wash water no longer shows calcium when tested with suitable reagent, as, for example, sodium oxalate, which, as well understood, form a precipitate of calcium oxalate. A lesser degree of refinement, however, may in some cases be suitable or desirable, and in such event the washing need not be carried to the extent described. However, in general, the zeolite is of higher grade when substantially all of the undesired calcium compounds have been removed.

After the granules have been so washed, practically all of the calcium compounds mechanically held by or within the zeolite have been removed, but the zeolite is now a calcium zeolite in the sense that in addition to the sodium or equivalent aluminum silicate it comprises calcium aluminum silicate. Inasmuch as calcium compounds are to be removed from water to be softened, it is desirable that the aluminum silicates of the zeolites shall be wholly or largely those of sodium. In consequence, the aforesaid calcium zeolite is not in condition efficiently to remove the calcium compounds from water to be softened, and the zeolite is in what may be termed the "exhausted" condition, as if it had been used in softening water containing calcium compounds, with the result that the calcium in the water had been exchanged for sodium of the sodium aluminum silicate; and inasmuch as it is desirable to ship or market the zeolite in condition best suited for softening water, the calcium zeolite is subjected to the action of a solution of sodium chloride, or equivalent salt of a metal of the potassium group, much in the same manner as exhausted zeolite is regenerated after use upon hard water. For this purpose, brine or sodium chloride solution, which may be prepared or contained in the tank 20, is circulated therefrom by the pump 21 through tank 16, where the granules may be agitated in the presence of the brine solution to effect exchange of sodium for the calcium of the zeolite.

The zeolite after treament with the brine solution is subjected to water to remove brine, and then, for convenience of shipment, may be withdrawn from the bottom of the tank 16 into the drain box 23, where most of the solution or water is drained from the material, which, if desired, may be left exposed to the air to effect drying before shipment.

If the zeolite is so air-dried, it will still contain approximately 20 per cent moisture. If all this moisture is driven off, as by drying at a temperature slightly above the boiling point of water, the zeolite may lose some of its exchange value, but it is still effective, and has a high exchange value, but the exchange value is not so great as in the case where the drying has not been carried to completion.

The zeolite produced as herein described has a specific gravity of approximately 1.66 to about 2.4. Its grains or granules are hard. It has comparatively high base-exchange value, approximately five times as great as the zeolites made from glauconite or green sand commonly used for like purposes. My zeolite has a further advantage in that it does not cause discoloration of water, as is frequently the case in the use of zeolite made from green sand or glauconite, particularly if not properly treated. My zeolite well withstands the action of hot water. It is affected to less extent by water to be softened which is slightly acid than are zeolites produced by precipitation or fusion; and when the water to be softened is slightly acid the water is not discolored by my material as in the case of the glauconite or green sand type.

I have found that furnace slag of the character herein referred to, and particularly iron furnace slag, may itself without the treatment herein described effect base exchange, as for softening water. Inasmuch as the hardness of water is generally caused by calcium compounds, it is preferred first to treat the raw slag, after subdivision into granules, by sodium chloride solution before use upon the water to be softened, to effect in the slag sodium base-exchange compounds.

For the sake of brevity in the appended claims, the term "iron furnace slag" is employed generically to include iron, manganese and equivalent furnace slags of the character herein described; and the term "caustic soda" is employed generically to include caustic soda and other or equivalent alkalis of the character herein indicated.

What I claim is:

1. In the art of producing base-exchange substances, the method which comprises effecting reaction between iron furnace slag and caustic soda, drying the reaction product, and while drying said product agitating it to effect subdivision of the dried product.

2. In the art of producing base-exchange substances, the method which comprises effecting reaction between iron furnace slag and caustic soda, drying the reaction product, and while drying said product agitating it to effect subdivision of the dried product, and thereafter effecting further subdivision and separating granules of predetermined range of sizes.

3. In the art of producing base-exchange substances, the method which comprises effecting reaction between iron furnace slag and caustic soda, drying the reaction product, and while drying said product agitating it to effect subdivision of the dried product, thereafter effecting further subdivision and separating from each other fines and larger granules, and effecting intermixture of the fines with the undried reaction product of a subsequent treatment of iron furnace slag with caustic soda.

4. In the art of producing base-exchange substances, the method which comprises effecting reaction between iron furnace slag and caustic soda, drying the reaction product, effecting subdivision of the dried product into fines and masses of larger size, and effecting intermixture of the fines with the undried reaction product of a subsequent treatment of iron furnace slag with caustic soda.

5. In the art of producing base-exchange substances, the method which comprises effecting reaction between iron furnace slag and caustic soda, drying the reaction product, and thereafter treating the reaction product with acid.

6. In the art of producing base-exchange substances, the method which comprises effecting reaction between iron furnace slag and caustic soda, drying the reaction product, and thereafter treating the reaction product with a dilute solution of mineral acid.

7. In the art of producing base-exchange substances, the method which comprises effecting reaction between iron furnace slag and caustic soda, drying the reaction product, and thereafter treating the reaction product with a dilute solution of sulphuric acid.

8. In the art of producing base-exchange substances, the method which comprises effecting reaction between iron furnace slag and caustic soda, drying the reaction product, washing the dried product, and thereafter subjecting the washed product to an acid.

9. In the art of producing base-exchange substances, the method which comprises effecting reaction between iron furnace slag and caustic soda, drying the reaction product, and subdividing it into granules, washing the granules, and thereafter subjecting the granules to acid.

10. In the art of producing base-exchange substances, the method which comprises effecting reaction between iron furnace slag and caustic soda, drying the reaction product, thereafter treating the reaction product with acid, and thereafter washing the product.

11. In the art of producing base-exchange substances, the method which comprises effecting reaction between iron furnace slag and caustic soda, drying the reaction product and subdividing it into granules, washing the granules, thereafter subjecting the granules to acid, and thereafter washing the granules.

12. In the art of producing base-exchange substances, the method which comprises effecting reaction between iron furnace slag and caustic soda, drying the reaction product, thereafter treating the reaction product with acid, and thereafter subjecting the product to a solution of sodium chloride.

13. In the art of producing base-exchange substances, the method which comprises effecting reaction between iron furnace slag and caustic soda, drying the reaction product, thereafter treating the reaction product with acid, and thereafter subjecting the product to a salt solution to effect exchange of the calcium of a double metal calcium silicate.

14. In the art of producing base-exchange substances, the method which comprises effecting reaction between iron furnace slag and caustic soda, drying the reaction product and subdividing it into granules, washing the granules, thereafter subjecting the granules to acid, thereafter washing the granules, and thereafter subjecting the granules to a salt solution.

15. In the art of producing base-exchange substances, the method which comprises effecting reaction between iron furnace slag and caustic soda, drying the reaction product, thereafter treating the reaction product with acid, thereafter subjecting the product to a salt solution, and thereafter drying the product.

16. A base-exchange substance comprising the product of reaction of iron furnace slag with caustic soda, in the form of hard granules, having a specific gravity within approximate limits of 1.66 to 2.4.

17. In the art of producing base-exchange substances, the method which comprises effecting reaction between iron furnace slag and caustic soda, thereafter treating the reaction product with acid, and thereafter replacing calcium of a bi-metal silicate with sodium.

18. In the art of producing base-exchange substances, the method which comprises treatment of iron furnace slag with salt solution to effect sodium base-exchange compounds.

19. In the manufacture of water-softening compounds, the method which comprises effecting reaction between iron furnace slag and caustic soda to effect a product having base-exchange properties, and refining said product to a substantial degree by removing therefrom compounds of calcium.

20. In the manufacture of water-softening compounds, the method which comprises effecting reaction between iron furnace slag and caustic soda to effect a product having base-exchange properties, refining said product to a substantial degree by removing therefrom compounds of calcium, and replacing calcium of a bi-metal silicate of said product by an alkali metal.

21. In the art of making water-softening compounds, the method which comprises boiling a mixture of iron furnace slag, caustic soda and water, drying the product, and thereafter refining said product to a substantial degree by removal of calcium compounds.

SVEIN DAHL-RODE.